United States Patent
Minami et al.

(10) Patent No.: US 10,179,366 B2
(45) Date of Patent: Jan. 15, 2019

(54) CUTTING TOOL

(71) Applicant: Kanefusa Kabushiki Kaisha, Niwa-gun, Aichi (JP)

(72) Inventors: Toru Minami, Niwa-gun (JP); Yasunari Yamada, Niwa-gun (JP)

(73) Assignee: Kanefusa Kabushiki Kaisha, Niwa-gun (JP)

( * ) Notice: Subject to any disclaimer, the term of this patent is extended or adjusted under 35 U.S.C. 154(b) by 170 days.

(21) Appl. No.: 15/122,779

(22) PCT Filed: Mar. 3, 2015

(86) PCT No.: PCT/JP2015/056225
§ 371 (c)(1),
(2) Date: Aug. 31, 2016

(87) PCT Pub. No.: WO2015/146507
PCT Pub. Date: Oct. 1, 2015

(65) Prior Publication Data
US 2017/0072474 A1 Mar. 16, 2017

(30) Foreign Application Priority Data
Mar. 25, 2014 (JP) .................................. 2014-061607

(51) Int. Cl.
*B23B 27/14* (2006.01)
*B27B 33/02* (2006.01)

(52) U.S. Cl.
CPC ............ *B23B 27/141* (2013.01); *B27B 33/02* (2013.01); *B23B 2200/245* (2013.01); *B23B 2228/105* (2013.01)

(58) Field of Classification Search
CPC ............ B23B 2228/105; B23B 27/141; B23B 2200/245; B27B 33/02; C23C 30/00; C23C 30/005
See application file for complete search history.

(56) References Cited

U.S. PATENT DOCUMENTS 5,597,272 A * 1/1997 Moriguchi ............ B23B 27/145
407/119
5,776,588 A * 7/1998 Moriguchi ............ B23B 27/145
407/119

(Continued)

FOREIGN PATENT DOCUMENTS

JP 5642412 B2 10/1981
JP 02218522 A 8/1990

(Continued)

OTHER PUBLICATIONS

International Search Report (PCT/ISA/210) dated Jun. 2, 2015 for corresponding PCT Application PCT/JP2015/056225 cites the foreign patent and publication documents.

*Primary Examiner* — Sara Addisu
(74) *Attorney, Agent, or Firm* — Norton Rose Fulbright US LLP (57) ABSTRACT

The invention suppresses chipping of a cutting edge of a cutting tool while maintaining sharpness of the cutting edge. [Solution] A coating (20) of a replaceable knife (10) of the cutting tool is formed so that either one of a rake-face coating portion (22) that coats a rake face (14) or a clearance-face coating portion (24) that coats a clearance face (16) becomes thicker than the other. The film thickness of the thicker coating portion (22, 24) is set in a range of 0.5 µm to 15.0 µm, and a ratio of the film thickness of the thinner coating portion (24, 22) to the film thickness of the thicker coating portion (22, 24) is set in a range of 0.01 to 0.15.

7 Claims, 10 Drawing Sheets

(56) References Cited

U.S. PATENT DOCUMENTS

| | | | |
|---|---|---|---|
| 6,565,957 B2* | 5/2003 | Nakamura | C23C 30/005 428/216 |
| 7,090,914 B2* | 8/2006 | Yamagata | C23C 30/005 428/174 |
| 7,435,486 B2* | 10/2008 | Dahlund | C23C 30/005 428/212 |
| 7,695,222 B2* | 4/2010 | Omori | B23B 27/143 407/113 |
| 7,967,533 B2* | 6/2011 | Omori | B23B 27/141 407/113 |
| 9,849,516 B2* | 12/2017 | Bjormander | B23B 27/148 |
| 2005/0202283 A1* | 9/2005 | Gates, Jr. | C23C 16/0272 428/698 |
| 2007/0269610 A1* | 11/2007 | Fukui | B23P 15/28 427/497 |
| 2008/0286462 A1* | 11/2008 | Cedergren | C22C 29/08 427/249.19 |
| 2009/0004449 A1* | 1/2009 | Ban | B23B 27/141 428/216 |
| 2009/0067938 A1* | 3/2009 | Omori | B23B 27/141 407/119 |
| 2009/0130434 A1* | 5/2009 | Zhu | C04B 35/58014 428/328 |
| 2009/0155559 A1* | 6/2009 | Xu | C23C 30/005 428/216 |
| 2009/0269150 A1 | 10/2009 | Omori et al. | |
| 2010/0166512 A1* | 7/2010 | Tanibuchi | C23C 16/34 407/119 |
| 2011/0020081 A1 | 1/2011 | Webb | |
| 2013/0177361 A1* | 7/2013 | Waki | C23C 14/0664 407/115 |
| 2014/0124098 A1* | 5/2014 | Duttlinger | C23C 14/0623 144/241 |
| 2014/0271000 A1* | 9/2014 | Sakamoto | C23C 30/005 407/119 |
| 2017/0189967 A1* | 7/2017 | Paseuth | B23B 27/14 |

FOREIGN PATENT DOCUMENTS

| | | |
|---|---|---|
| JP | H05-261616 | 10/1993 |
| JP | H07-196379 | 8/1995 |
| JP | P2001-347403 | 12/2001 |
| JP | P2002 94546 A | 7/2002 |
| JP | 2004122263 A | 4/2004 |
| JP | 2005007555 A | 1/2005 |
| JP | P2005-103658 A | 4/2005 |
| JP | 2007290180 | 11/2007 |
| JP | P2012-176471 A | 9/2012 |
| JP | 2015085462 A | 5/2015 |

* cited by examiner

FIG. 11A
TEST EXAMPLE 4
NON-CUTTING PORTION | CUTTING PORTION

FIG. 11B
TEST EXAMPLE 1
NON-CUTTING PORTION | CUTTING PORTION

FIG. 11C
COMPARATIVE EXAMPLE 1
NON-CUTTING PORTION | CUTTING PORTION

FIG. 12A  TEST EXAMPLE 8  RADIUS OF R SURFACE: 0.4μm
BEVEL DISTANCE: 0.5μm

NON-CUTTING PORTION | CUTTING PORTION

FIG. 12B  TEST EXAMPLE 9  RADIUS OF R SURFACE: 0.5μm
BEVEL DISTANCE: 0.6μm

NON-CUTTING PORTION | CUTTING PORTION

FIG. 12C  TEST EXAMPLE 10  RADIUS OF R SURFACE: 1.1μm
BEVEL DISTANCE: 1.3μm

NON-CUTTING PORTION | CUTTING PORTION

FIG. 12D  TEST EXAMPLE 11  RADIUS OF R SURFACE: 1.8μm
BEVEL DISTANCE: 2.1μm

NON-CUTTING PORTION | CUTTING PORTION

FIG. 12E  TEST EXAMPLE 12  RADIUS OF R SURFACE: 3.1μm
BEVEL DISTANCE: 3.6μm

NON-CUTTING PORTION | CUTTING PORTION

FIG. 12F  TEST EXAMPLE 13  RADIUS OF R SURFACE: 6.0μm
BEVEL DISTANCE: 7.0μm

NON-CUTTING PORTION | CUTTING PORTION

CUTTING TOOL

CROSS REFERENCE TO RELATED APPLICATIONS

This application is a national stage of international application no. PCT/JP2015/056225, filed on Mar. 3, 2015, and claims the benefit of priority under 35 USC 119 of Japanese Patent Application No. 2014-061607, filed on Mar. 25, 2014, which are incorporated herein by reference.

TECHNICAL FIELD

The present invention relates to a cutting tool for use in cutting non-ferrous metals, alloys thereof, wood, woody materials or resins.

BACKGROUND ART

As a cutting tool for cutting a wood, a cutter with an abrasion resistance improved by coating one or both of the rake face and the clearance face with a hard coating has been proposed (e.g., see Patent Literature 1). A hard coating is formed on a base material such as tool steel by a coating treatment with an arc ion plating apparatus with a film thickness of for example, about 4 μm over the rake face and the clearance face. Then, either one of the rake face or the clearance face is ground for edging. Accordingly, a cutting tool is provided which has the base material exposed through either one of the rake face or the clearance face, with the other non-ground one of the rake face or the clearance face being covered with a hard coating. To obtain a cutting tool having both the rake face and the clearance face coated with a hard coating, the base material should be subjected to grinding for edging beforehand.

CITATION LIST

Patent Literature

Patent Literature: Japanese Patent Application Laid-Open No. 2007-290180

SUMMARY OF THE INVENTION

Problems to be Solved by the Invention

A cutting tool with either one of the rake face or the clearance face covered with a hard coating requires a special dedicated grinding stone or severe grinding conditions in order to obtain a good edging quality, which brings about a problem of increasing the manufacturing cost. With regard to a cutting tool having both of the rake face and the clearance face coated with a hard coating without considering the ratio of the film thicknesses of the hard coatings on the rake face and the clearance face, by way of contrast, the wearing rates of the rake face and the clearance face in cutting a workpiece material do not differ much, so that the shape of the worn cutting edge becomes rounded. That is, the cutting tool with both faces coated cannot be expected to maintain the sharp cutting edge, which is originated from the self-sharpening property of the one-face coated cutting tool such that wearing of the face that is not coated with a hard coating progresses quicker than wearing of the face coated with a hard coating. In addition, it is known that when both of the rake face and the clearance face are coated with a hard coating without considering the ratio of the film thicknesses of the hard coatings on the rake face and the clearance face, chipping of the hard coating at the cutting edge is likely to occur due to stress locally residual at the cutting edge having an acute angle.

That is, the invention has been proposed in view of the above problems of the conventional art and to solve the problems favorably, and it is an object of the invention to provide a cutting tool that can suppress chipping of the cutting edge while maintaining the sharpness of the cutting edge.

Means for Solving the Problems

To overcome the problems and achieve an intended purpose, the gist of a cutting tool of the subject matter according to claim 1 of the present application is that a cutting tool that has a coating formed to coat a base material over at least a part of a rake face and a part of a clearance face including a cutting edge, and is for use in cutting non-ferrous metals, alloys thereof, wood, woody materials or resins, wherein the coating is formed so that either one of a rake-face coating portion coating the rake face or a clearance-face coating portion coating the clearance face becomes thicker than an other one of the clearance-face coating portion or the rake-face coating portion, and a film thickness of the thicker coating portion is set in a range of 0.5 μm to 15.0 μm, and a ratio of a film thickness of the thinner coating portion to the film thickness of the thicker coating portion is set in a range of 0.01 to 0.15.

According to the subject matter of claim 1, the cutting tool has a self-sharpening property such that wearing of either one of the rake face or the clearance face whose coating has a thinner film thickness progresses quicker than the other one those coating has a thicker film thickness, thus making it possible to maintain the sharpness of the cutting edge. Further, chipping of the cutting edge can be suppressed by forming the coating in such a way that the film thickness of the coating on the rake face differs from that on the clearance face.

The gist of the subject matter according to claim 2 is that a portion of the base material that corresponds to the cutting edge is formed so as to be separated from an intersection of an extension line of a rake face of the base material and an extension line of a clearance face of the base material in a range of 0.2 μm to 18 μm.

According to the subject matter of claim 2, chipping of the cutting edge of the cutting tool having the coating coated over the rake face and the clearance face including a port on of the base material that corresponds to the cutting edge can be suppressed more by beveling the portion of the base material corresponding to the cutting edge.

The gist of the subject matter according to claim 3 is that the portion of the base material that corresponds to the cutting edge is formed in an arc shape with a radius of 0.5 μm to 6.0 μm.

According to the subject matter of claim 3, chipping of the cutting edge of the cutting tool having the coating coated over the rake face and the clearance face including a portion of the base material that corresponds to the cutting edge can be suppressed more preferably by forming the portion of the base material corresponding to the cutting edge in an arc shape.

The gist of the subject matter according to claim 4 is that the ratio of the film thickness of the thinner coating portion to the film thickness of the thicker coating portion is set in a range of 0.01 to 0.05.

According to the subject matter of claim 4, setting the ratio of the film thickness of the thinner coating portion to the film thickness of the thicker coating portion in the range of 0.01 to 0.05 can achieve the sharpness of the cutting edge originated from the self-sharpening property and suppression of chipping of the cutting edge in good balance.

The gist of the subject matter according to claim 5 is that the coating has a layer comprising one or more of nitride, oxynitride, oxide, carbide, carbonate, carbonitride and carboxynitride each of which contains at least chromium.

According to the subject matter of claim 5, providing the cutting tool with a layer containing chromium as a coating makes it possible to improve the wear resistance and corrosion resistance.

Effects of the Invention

According to the cutting tool of the invention, it is possible to suppress chipping of the cutting edge while maintaining the sharpness of the cutting edge.

BRIEF DESCRIPTION OF DRAWINGS

FIGS. 1A and 1B FIG. 1A is a plan view illustrating a replaceable knife of a cutting tool according to a preferred embodiment of the invention.

FIGS. 6A to 6C FIG. 6A illustrates the film thickness of the coating on the rake face of each of cemented carbide replaceable knives of Test Examples 1 to 4 at each distance from the cutting edge.

FIGS. 7A to 7E Diagrams illustrating the cross-sectional shape of the cutting edge of the cemented carbide replaceable knife after performing Test 1.

FIGS. 9A to 9D Diagrams illustrating the cross-sectional shape of the cutting edge of the cemented carbide replaceable knife after performing Test 2.

FIGS. 10A to 10C Electron microscopic photographs of the cutting edge of the cemented carbide replaceable knife in enlargement, wherein

FIGS. 11A to 11C Diagrams illustrating superposed edge line roughnesses before and after the cutting test in the Test 1, wherein

FIGS. 12A to 12F Diagrams illustrating superposed edge line roughnesses before and after the cutting test in the Test 3, wherein

MODE FOR CARRYING OUT THE INVENTION

Next, a cutting tool according to the invention is described below by way of a preferred embodiment with reference to the accompanying drawings.

Embodiment

A replaceable knife 10 of a cutting tool according to an embodiment comprises a steel such as tool steel, cutlery steel, bearing steel or stainless steel, or cermet containing cemented carbide, taken alone or a composite thereof, as a base material 12 (see FIGS. 1A to 3). The replaceable knife 10 of the cutting tool has a hard coating 20 formed on both a rake face 14 and a clearance face 16 with respect to the base material 12 that has been edged by grinding in order to improve the abrasion resistance, and the rake face 14 and the clearance face 16 including a cutting edge 18 are coated with the coating 20. The coating 20 may coat the rake face 14 and the clearance face 16 entirely, or may be formed to coat a partial area of the rake face 14 in a direction of going away from the cutting edge 18 and/or a partial area of the clearance face 16 in a direction of going away from the cutting edge 18. That is, those areas of the rake face 14 and the clearance face 16 of the replaceable knife 10 of the cutting tool which are mainly used in cutting a workpiece material (a range of 0.1 mm from the cutting edge 18) have only to be coated with the coating 20.

The coating 20 has a main layer (layer) comprising one or more of nitride, oxynitride, oxide, carbide, carbonate, carbonitride and carboxynitride each of which contains at least chromium, and the main layer containing chromium faces the outer surface of the coating 20. That is, chromium nitride (CrN), chromium oxynitride (CrNO), chromium oxide (CrO), chromium carbide (CrC), chromium carbonate (CrCO), chromium carbonitride (CrCN), and chromium carboxynitride (CrCNO) are available for the main layer. Since the coating 20 has a layer containing chromium, it is possible to improve the wear resistance with respect to a target workpiece material such as wood. In addition, chromium may be combined with at least one element selected from B (boron), Al (aluminum), Si (silicon), Ti (titanium), V (vanadium), Ni (nickel), Cu (copper), Y (yttrium), Zr (zirconium), Nb (niobium), Mo (molybdenum), Hf (hafnium), Ta (tantalum), and W (tungsten). Increasing the hardness of the coating 20, refinement of the structure, or the like may be expected by adding at least one aforementioned element to chromium, which may also improve the wear resistance, the corrosion resistance, the strength, etc. Further, the life may also be improved by adjusting an element to be added in accordance with a workpiece material. Furthermore, the coating 20 may be formed by laminating a plurality of main layers or providing an appropriate base layer between the main layer and the base material 12. As the base layer, other metals than chromium, a layer of at least one kind among a metal, nitride, carbide, carbonitride, carbonate, oxide, oxynitride, carboxynitride and the like each containing one or more kinds of elements such as titanium and aluminum is available.

As shown in FIGS. 2 to 5, the coating 20 is formed so that a film thickness C1 of the rake-face coating portion 22, which covers the rake face 14, differs from a film thickness C2 of the clearance-face coating portion 24, which covers the clearance face 16. That is, the coating 20 is formed so that either one of the rake-face coating portion 22 or the clearance-face coating portion 24 has a thicker film thickness C1, C2 than the other coating portion 24, 22. When the rake face 14 is the principal portion of the replaceable knife 10 of the cutting tool, the rake-face coating portion 22 is formed thicker than the clearance-face coating portion 24, the film thickness C1 of the rake-face coating portion 22 is set in a range of 0.5 µm to 15 µm, and the ratio of the film thickness C2 of the clearance-face coating portion 24 to the film thickness C1 of the rake-face coating portion 22 is set in a range of 0.01 to 0.15, preferably in a range of 0.01 to 0.05. When the clearance face 16 is the principal portion of the replaceable knife 10 of the cutting tool, the clearance-face coating portion 24 is formed thicker than the rake-face coating portion 22, the film thickness C2 of the clearance-face coating portion 24 is set in a range of 0.5 µm to 15 µm, and the ratio of the film thickness C of the rake-face coating portion 22 to the film thickness C2 of the clearance-face coating portion 24 is set in a range of 0.01 to 0.15, preferably in a range of 0.01 to 0.05. While the ratio between the film thickness C1 of the rake-face coating portion 22 and the film thickness C2 of the clearance-face coating portion 24 may be set so as to satisfy the aforementioned range over the entire face, the ratio should satisfy the aforementioned range within those areas of the rake face 14 and the clearance face 16 which are mainly used in cutting a workpiece material (within a range of 0.1 mm from the cutting edge 18).

As mentioned above, the film thickness C1, C2 of the thicker coating portion 22, 24 is set in a range of 0.5 µm to 15 µm, whereas the film thickness C2, C1 of the thinner coating portion 24, 22 is set in a range of 0.005 µm to 2.25 µm. When the film thickness C1, C2 of the thicker coating portion 22, 24, which is the principal portion, becomes thinner than 0.5 µm, the wear resistance cannot be improved sufficiently, whereas when the film thickness C1, C2 becomes thicker than 15 µm, a defect of the coating 20 such as chipping is likely to occur. When the ratio of the film thickness C2, C1 of the thinner coating portion 24, 22 to the film thickness of C1, C2 of the thicker coating portion 22, 24 becomes larger than 0.15, the self-sharpening property originated from quicker progress of wearing at the face 16, 14 that is coated with the thinner coating portion 24, 22, than at the face 14, 16 that is coated with the thicker coating portion 22, 24, does not appear strongly, making it difficult to maintain the sharpness of the cutting edge 18. Further, the coating 20 whose ratio of the film thickness C2, C1 of the thinner coating portion 24, 22 to the film thickness of C1, C2 of the thicker coating portion 22, 24 becomes less than 0.01 is not practically feasible for certain reasons in manufacturing the coating 20. It is to be noted that the rake face 14 or the clearance face 16 that is a principal portion in the replaceable knife 10 of the cutting tool, should be appropriately selected depending on how the replaceable knife 10 of the cutting tool is used, the face 14, 16 to be reground or the like.

The aforementioned ratio between the film thickness C1 of the rake-face coating portion 22 and the film thickness C2 of the clearance-face coating portion 24 is a contrast therebetween at the same distance from the cutting edge 18. For example, the ratio between the film thickness C1 of the rake-face coating portion 22 at a position 0.05 mm away from the cutting edge 18 and the film thickness C2 of the clearance-face coating portion 24 at a position 0.05 mm away from the cutting edge 18 is set so as to lie within the aforementioned range, and the ratio between the film thickness C1 of the rake-face coating portion 22 at a position 0.1 mm away from the cutting edge 18 and the film thickness C2 of the clearance-face coating portion 24 at a position 0.1 mm away from the cutting edge 18 is set so as to lie within the aforementioned range. That is, the ratio between the film thickness C1 of the rake-face coating portion 22 and the film thickness C2 of the clearance-face coating portion 24 is set so as to satisfy the aforementioned range at each distance from the cutting edge 18. Furthermore, the coating 20 may be formed with the same thickness over the entire length from the cutting edge 18, but may be formed inclined in such a way that the film thickness of the coating 20 becomes smaller as the coating 20 goes away from the cutting edge 18.

Figure 2:
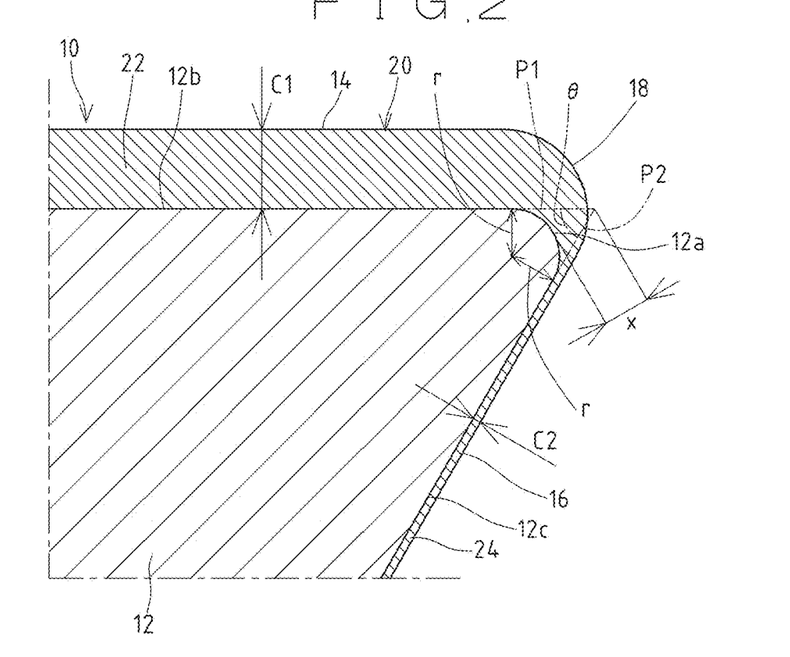
FIG. 2 An exemplary cross-sectional view illustrating the cutting edge of the cutting tool according to the embodiment in a case where the coating on a rake face is made thicker than that on a clearance face.
Figure 3:
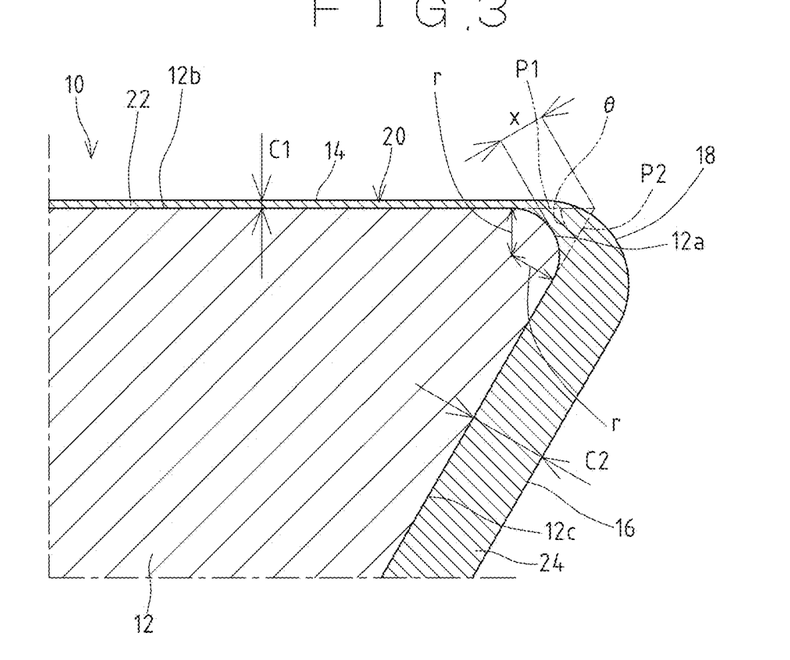
FIG. 3 An exemplary cross-sectional view illustrating the cutting edge of the cutting tool according to the embodiment in a case where the coating on the clearance face is made thicker than that on the rake face.
Figure 4:
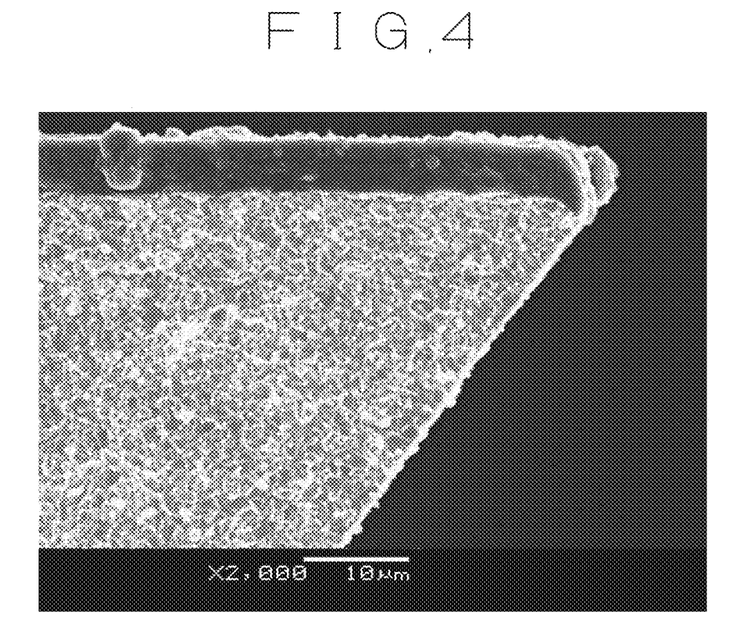
FIG. 4 An electron microscopic photograph of an enlarged cross-section of the essential part of a cemented carbide replaceable knife, showing a Test Example 4.
Figure 5:
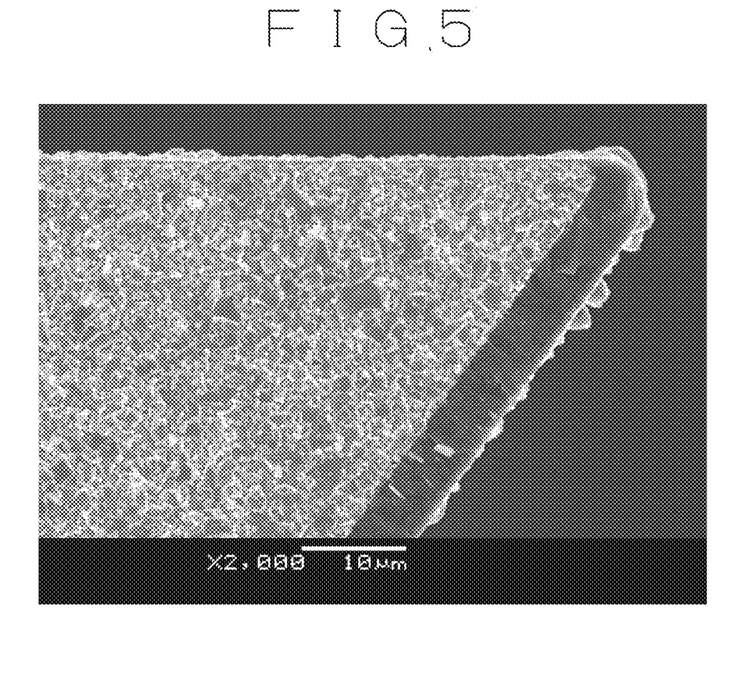
FIG. 5 An electron microscopic photograph of an enlarged cross-section of the essential part of the cemented carbide replaceable knife, showing a Test Example 7.

As shown in FIGS. 2 and 3, the portion of the base material 12 that corresponds to the cutting edge 18 (hereinafter referred to as a base-material edge 12a) is formed so as to be separated from an intersection of a virtual line (extension line) P1 extending from a rake face 12b of the base material 12 and a virtual line (extension line) P2 extending from a clearance face 12c of the base material 12. Here, a bevel distance x from the intersection to the base-material edge 12a is set in a range of 0.20 µm to 18 µm. In the embodiment, the base-material edge 12a is formed in an arc shape with a radius r being in a range of 0.5 µm to 6.0 µm. Note that the bevel distance x refers to the distance at a location where the intersection and the base-material edge 12a are closest to each other; for example, when the base-material edge 12a is rounded (R), the bevel distance is the distance from a point at which a virtual line passing through the center of a wedge angle θ formed by the rake face 12b and the clearance face 12c of the base material 12 crosses the base-material edge 12a to the aforementioned intersection.

When the bevel distance x is set greater than 18 µm, the sharpness of the cutting edge 18 of the replaceable knife 10 of the cutting tool which is obtained by forming the coating 20 is impaired, causing demerits such as the edge becoming blunt and an increase in power required for cutting. Similarly, when the base-material edge 12a is formed in an arc shape with a radius set larger than 6 µm, the sharpness of the cutting edge 18 of the replaceable knife 10 of the cutting tool which is obtained by forming the coating 20 is impaired, causing demerits such as the edge becoming blunt and an increase in power required for cutting. Setting the bevel distance x smaller than 0.20 μm is substantially difficult due to the constraints on the machining accuracy, and does not bring about a large difference from the base-material edge 12a being sharpened after subjecting the rake face 12b and the clearance face 12c to grinding for edging at the time the coating 20 is formed. Similarly, forming the base-material edge 12a in an arc shape with a radius set smaller than 0.5 μm is substantially difficult due to the constraints on the machining accuracy, and does not bring about a large difference from the base-material edge 12a being sharpened after subjecting the rake face 12b and the clearance face 12c to grinding for edging at the time the coating 20 is formed. Further, if the base-material edge 12a is beveled less than the aforementioned range, the effect of beveling of the base-material edge 12a to suppress chipping at the cutting portion of the cutting edge 18 may not be expected.

The coating 20 may be formed by PVD (physical vapor deposition), and arc ion plating is suitable among PVD processes; however, magnetron sputtering may be employed. For example, when performing PVD process in a chamber, the coating 20 on either one of the rake face 14 or the clearance face 16 may be made thicker than that on the other face by, for example, setting either one of the rake face 12b or the clearance face 12c of the base material 12 behind a shield with respect to the evaporation source of chromium or the like, or adjusting the direction of installation of the base material 12 with respect to the evaporation source. As apparent from the above, the coating 20 having different film thicknesses C1, C2 at the rake face 14 and the clearance face 16 may be easily formed in the one-batch PVD process.

Operation of Embodiment

Next, the operation of the replaceable knife 10 of the cutting tool according to the embodiment is described. The replaceable knife 10 of the cutting tool has the coating 20 formed with different film thicknesses C1, C2 at the rake face 14 and the clearance face 16, so that at the time of cutting the workpiece material, the self-sharpening property appears which quickens the progress of wearing of either one of the rake face 14 or the clearance face 16 at which the film thickness of the coating 20 is thinner than the other face at which the film thickness of the coating 20 is thicker, and this self-sharpening property can maintain the sharpness of the cutting edge 18. Moreover, both of the rake face 14 and the clearance face 16 of the replaceable knife 10 of the cutting tool are covered with the coating 20, so that even for the face at which the film thickness of the coating 20 is thin, the existence of the coatings 20 makes it possible to reduce the width of the wearing area, as compared to a single-face coated knife obtained by grinding one face after the coating 20 is formed on both faces, thus making it possible to reduce friction with the workpiece material at the time of cutting.

Because the coating 20 is formed thinner at either one of the rake face 14 or the clearance face 16 than at the other one, it is possible to suppress the occurrence of high residual stresses, thus making it possible to prevent occurrence of chipping (self-destruction) of the cutting edge 18 originated from the residual stresses. Further, by making the coating 20 thinner at either one of the rake face 14 or the clearance face 16 than at the other one, the coating 20 makes it possible to suppress chipping of the cutting portion of the cutting edge 18 that contacts the workpiece material as well as the non-cutting portion of the cutting edge 18 that does not contact the workpiece material at the time of cutting, as compared with the one-face coated knife or a double-face coated knife having both of the rake face and the clearance face coated with a coating without considering the ratio of the film thicknesses of the coatings on the rake face and the clearance face. Further, unlike the one-face coated knife, the replaceable knife 10 of the cutting tool of the embodiment does not need to remove the coating 20 on the rake face 14 or the clearance face 16 by grinding for edging after the formation of the coating 20, so that chipping due to grinding for edging of the cutting edge 18 does not occur. Moreover, there is not any restriction such as a special dedicated grinding stone or severe grinding conditions which are needed for grinding for edging after the formation of the coating, thus making it possible to reduce the manufacturing cost. Note that it is possible to achieve maintenance of the sharpness of the cutting edge 18 due to the self-sharpening property and suppression of chipping of the cutting edge 18 in good balance by setting the ratio of the film thickness C2, C1 of one of the coating portion 24, 22 of the coating 20 to the film thickness C1, C2 of the other coating portion 22, 24 in the range of 0.01 to 0.05.

The replaceable knife 10 of the cutting tool has the base-material edge 12a beveled to form very small surface (R surface in the embodiment) on the edge 12a, so that occurrence of the high residual stresses can be suppressed more in a synergistic effect with making the film thickness of the coating on either one of the rake face 14 or the clearance face 16 thinner than that on the other one. This makes it possible to prevent the occurrence of chipping (self-destruction) of the cutting edge 18 due to the residual stress more favorably. Further, beveling the base-material edges 12a makes it possible to more favorably suppress the chipping of the cutting portion of the cutting edge 18 that contacts the workpiece material as well as the non-cutting portion of the cutting edge 18 that does not contact the workpiece material at the time of cutting.

[Test 1]

Figure 1A:
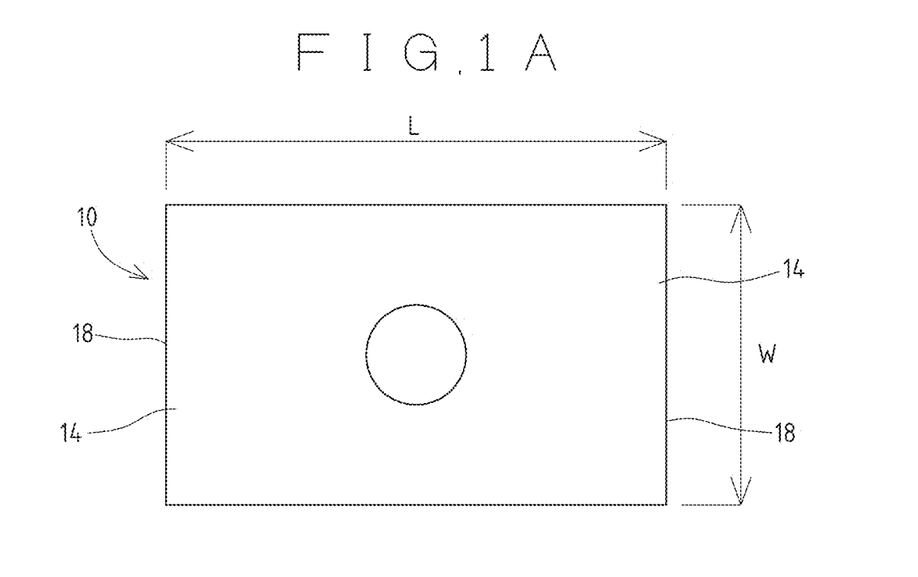
Figure 1B:
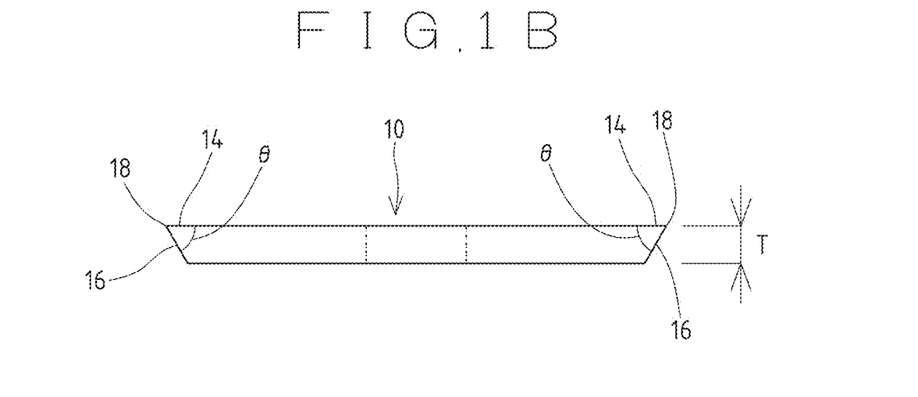
FIG. 1B is a front view.
Figure 6A:
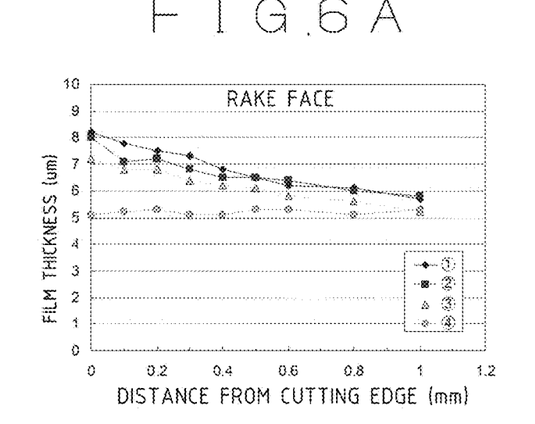
Figure 6B:
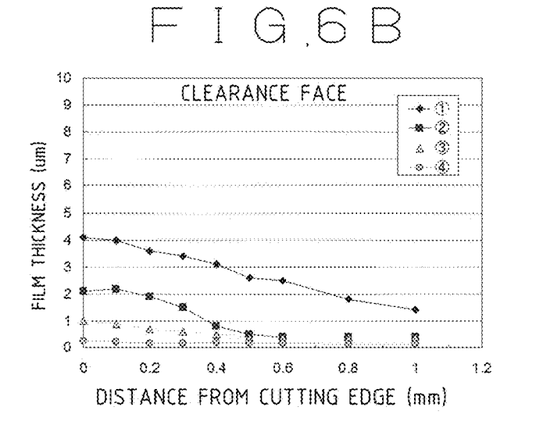
FIG. 6B illustrates the film thickness of the coating on the clearance face of each of the cemented carbide replaceable knives of the Test Examples 1 to 4 at each distance from the cutting edge.
Figure 6C:
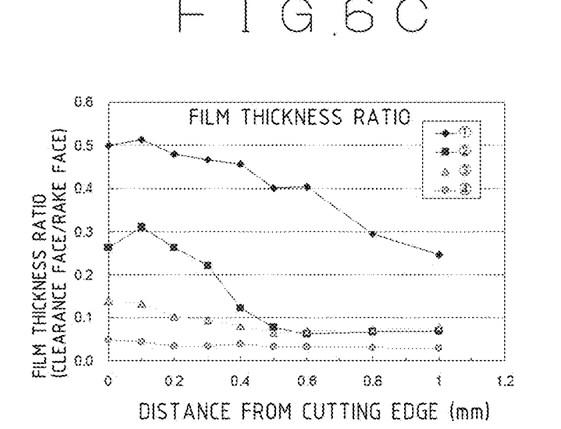
FIG. 6C illustrates the ratio of the film thickness of the coating on the clearance face to the film thickness of the coating on the rake face at each distance from the cutting edge of each of the cemented carbide replaceable knives of the Test Examples 1 to 4. Circled number 1 corresponds to the Test Example 1, circled number 2 corresponds to the Test Example 2, circled number 3 corresponds to the Test Example 3, and circled number 4 corresponds to the Test Example 4.

In the PVD apparatus, composite multilayer coatings having a lamination of CrN, CrNO and $Cr_2O_3$ were formed on the base materials comprising a cemented carbide under the same conditions, thereby preparing cemented carbide replaceable knives for router bits of Test Examples 1 to 4 and a Comparative Example 1. Each cemented carbide replaceable knife has a shape as shown in FIGS. 1A and 1B, and has a length L of 20 mm, a width W of 12 mm, and a thickness T of 1.5 mm, with a wedge angle θ between the rake face 14 and the clearance face 16 being set to 55°. The film thicknesses of the coatings are as shown in FIGS. 6A to 6C. The composite multilayer coating of the Test 1 has a structure including five layers of CrN, one layer of CrNO, one layer of $Cr_2O_3$, one layer of CrN, one layer of CrNO, and one layer of $Cr_2O_3$ laminated from the base material side in the named order, and the film thicknesses of the individual layers with respect to the total thickness are, from the base material side in order, 50% for the CrN layer, 10% for the CrNO layer, 10% for the $Cr_2O3$ layer, 10% for the CrN layer, 10% for the CrNO layer, and 10% for the topmost $Cr_2O_3$ layer. Note that the CrNO layer is an oxynitride, which does not show diffraction peaks of a chromium oxide in X-ray diffraction. Further, the $Cr_2O_3$ layer shows diffraction peaks of a chromium oxide appearing in X-ray diffraction, and the $Cr_2O_3$ layer may also contain nitrogen slightly.

In the Test 1, a cutting test was performed for cutting a European red pine laminated lumber with an NC router having a router bit (cutting diameter of 46 mm) fitted with the cemented carbide replaceable knives of the Test Examples 1 to 4 and the Comparative Example 1. The workpiece material was cut 180 m with the knife cut in the workpiece material by 20 mm at the rotational speed of the router bit of 6000 rpm, and while feeding the workpiece material at the feeding speed of 1 m/min. After the cutting, the amount of recession of the cutting edge and a wearing area width B were measured through the cross-sectional shape of the cutting edge. The measurement results are illustrated in FIGS. 7A to 7E.

Figure 7A:
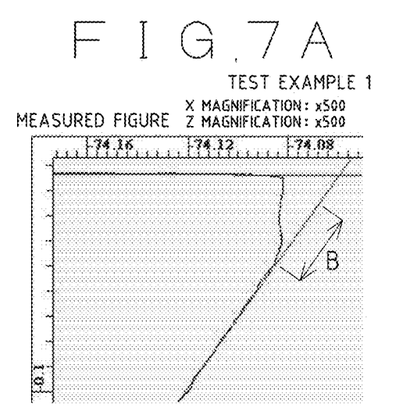
FIG. 7A shows a Test Example 1.
Figure 7B:
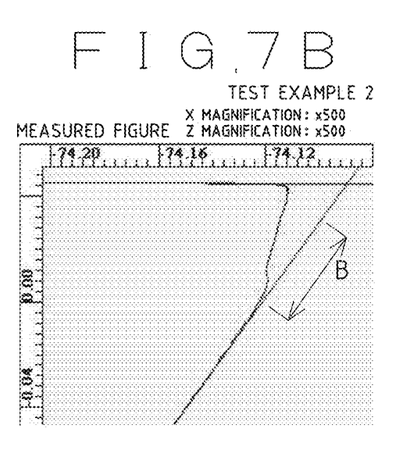
FIG. 7B shows a Test Example 2.
Figure 7C:
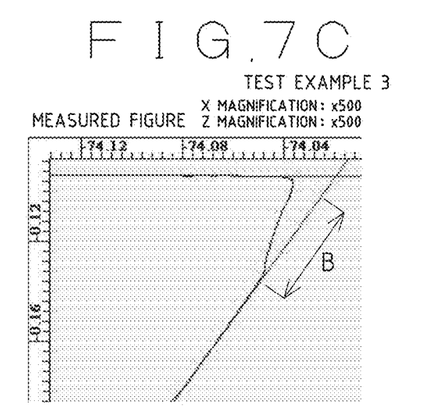
FIG. 7C shows a Test Example 3.
Figure 7D:
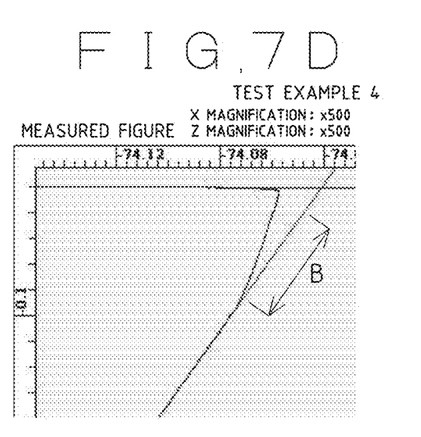
FIG. 7D shows a Test Example 4.
Figure 7E:
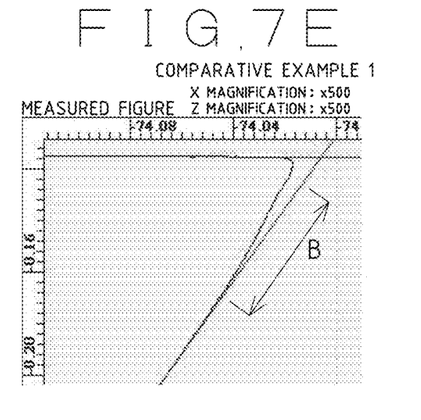
FIG. 7E shows a Comparative Example 1, FIGS. 8A to 8C

Circled number 1 in FIGS. 6A to 6C corresponds to the Test Example 1, and the cross-sectional shape of the cutting edge after the cutting test with the cemented carbide replaceable knife of the Test Example 1 is illustrated in FIG. 7A. Circled number 2 in FIGS. 6A to 6C corresponds to the Test Example 2, and the cross-sectional shape of the cutting edge after the cutting test with the cemented carbide replaceable knife of the Test Example 2 is illustrated in FIG. 7B. Circled number 3 in FIGS. 6A to 6C corresponds to the Test Example 3, and the cross-sectional shape of the cutting edge after the cutting test with the cemented carbide replaceable knife of the Test Example 3 is illustrated in FIG. 7C. Circled number 4 in FIGS. 6A to 6C corresponds to the Test Example 4, and the cross-sectional shape of the cutting edge after the cutting test with the cemented carbide replaceable knife of the Test Example 4 is illustrated in FIG. 7D. FIG. 7E illustrates the cross-sectional shape of the cutting edge after the cutting test with the cemented carbide replaceable knife of the Comparative Example 1 in which the cemented carbide replaceable knife having the coating formed on the rake face and the clearance face under the same conditions as set for the cemented carbide replaceable knife of the Test Example 1 was subjected to grinding for edging to remove the coating on the clearance face. That is, the film thickness of the coating of the cemented carbide replaceable knife of the Comparative Example 1, which coats the rake face, is the same as the film thickness of the rake-face coating portion of the Test Example 1. The rake-face coating portion of each of the cemented carbide replaceable knives of the Test Examples 1 to 4 is thicker at the coating than the clearance-face coating portion, and is in a range of about 5 μm to 8.5 μm, which lies within the range of 0.5 μm to 15 μm. As illustrated in FIGS. 7C and 7D, it is apparent that the cemented carbide replaceable knives of the Test Examples 3 and 4 wherein the ratio of the film thickness of the clearance-face coating portion to the film thickness of the rake-face coating portion is 0.15 or less suppress the dropping of the sharpness of the cutting edge even in comparison with the cemented carbide replaceable knife of the Comparative Example 1 illustrated in FIG. 7E, and it is apparent that the cemented carbide replaceable knife of the Test Example 4 wherein the ratio of the film thickness of the clearance-face coating portion to the film thickness of the rake-face coating portion is 0.05 or less has the self-sharpening property that favorably compares with the cemented carbide replaceable knife of the Comparative Example 1. Further, as illustrated in FIGS. 7A to 7E, it can be seen that the cemented carbide replaceable knives of the Test Examples 1 to 4 wherein both of the rake face and the clearance face are coated with the coating have a wearing area width B smaller than that of the cemented carbide replaceable knife of the Comparative Example 1 wherein only the rake face is coated with the coating.

[Test 2]

Figure 8A:
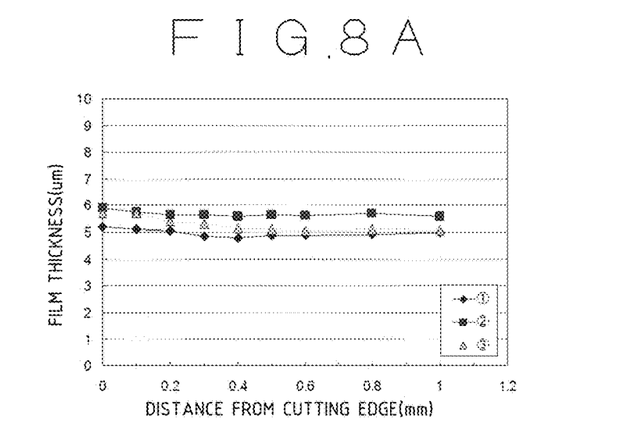
FIG. 8A illustrates the film thickness of the coating on the rake face of each of cemented carbide replaceable knives of Test Examples 5 to 7 at each distance from the cutting edge.
Figure 8B:
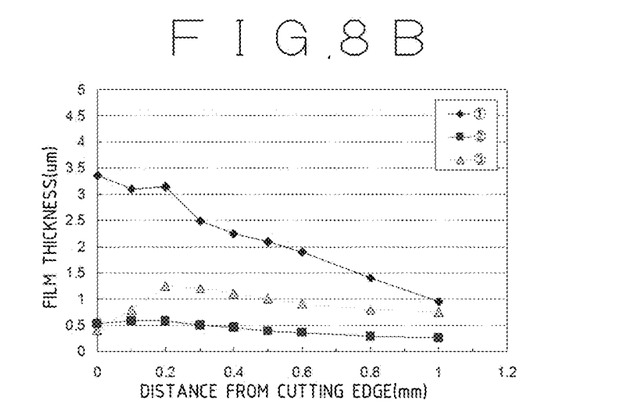
FIG. 8B illustrates the film thickness of the coating on the clearance face of each of the cemented carbide replaceable knives of the Test Examples 5 to 7 at each distance from the cutting edge.
Figure 8C:
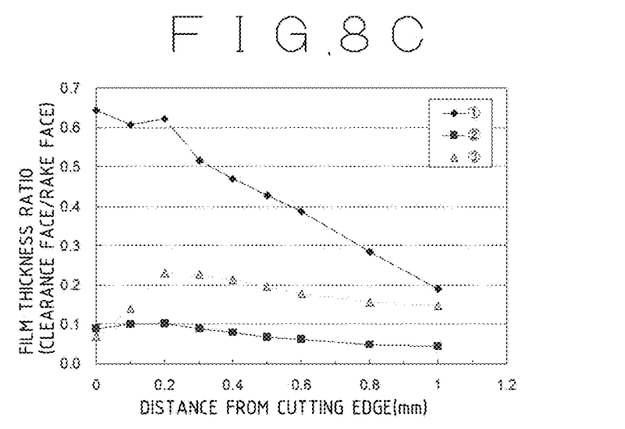
FIG. 8C illustrates the ratio of the film thickness of the coating on the clearance face to the film thickness of the coating on the rake face at each distance from the cutting edge of each of the cemented carbide replaceable knives of the Test Examples 5 to 7. Circled number 1 corresponds to the Test Example 5, circled number 2 corresponds to the Test Example 6, and circled number 3 corresponds to the Test Example 7.

In the PVD apparatus, composite multilayer coatings having a lamination of CrN, CrNO and $Cr_2O_3$ were formed on the base materials comprising a cemented carbide under the same conditions, thereby preparing cemented carbide replaceable knives for router bits of Test Examples 5 to 7 and Comparative Example 2. Each cemented carbide replaceable knife has a shape as shown in FIGS. 1A and 1B, and has a length L of 15 mm, a width W of 15 mm, and a thickness T of 2.5 mm, with a wedge angle θ being set to 60°. Note that because of the designs of the cutting tools to be used, the cemented carbide replaceable knives of the Test Examples 5 to 7 and the Comparative Example 2 have a rake-face and clearance face relationship opposite to that of the Test Examples 1 to 4 and the Comparative Example 1, and are used in such a way that the top surface indicated by numeral 14 in FIG. 1B is the clearance face and the inclined surface indicated by numeral 16 is the rake face. Note that the cemented carbide replaceable knives of the Test Examples 5 to 7 and the Comparative Example 2 are set in such a way as to form the rake-face coating portion with a film thickness of 5 μm to 6 μm on the rake-face coating portion. The film thicknesses of the coatings are as shown in FIGS. 8A to 8C. The composite multilayer coating of the Test 2 has a structure including four layers of CrN, one layer of CrNO, and one layer of $Cr_2O_3$ laminated from the base material side in the named order, and the film thicknesses of the individual layers with respect to the total thickness are, from the base material side in order, 60% for the CrN layer, 20% for the CrNO layer, and 20% for the topmost $Cr_2O_3$ layer. Note that the CrNO layer is an oxynitride, which does not show diffraction peaks of a chromium oxide in X-ray diffraction. Further, the $Cr_2O_3$ layer shows diffraction peaks of a chromium oxide appearing in X-ray diffraction, and the $Cr_2O_3$ layer may also contain nitrogen slightly.

In the Test 2, a cutting test was performed for cutting a European red pine laminated lumber with a router bit having a diameter of 75 mm fitted with the cemented carbide replaceable knives of the Test Examples 5 to 7 and the Comparative Example 2. The workpiece material was cut 120 m with the knife cut in the workpiece material by 20 mm at the rotational speed of the router bit of 6000 rpm, and while feeding the workpiece material at the feeding speed of 1 m/min. After the cutting, the amount of recession of the cutting edge and a wearing area width B were measured through the cross-sectional shape of the cutting edge. The measurement results are illustrated in FIGS. 9A to 9D.

Figure 9A:
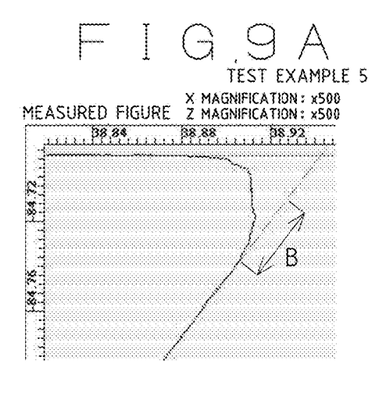
FIG. 9A shows a Test Example 5.
Figure 9B:
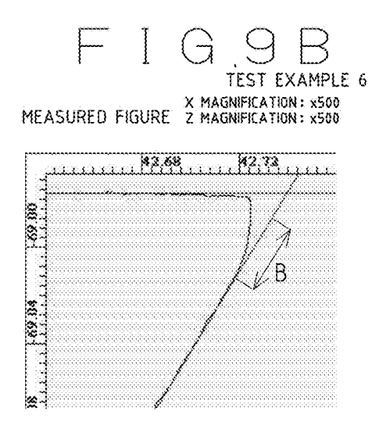
FIG. 9B shows a Test Example 6.
Figure 9C:
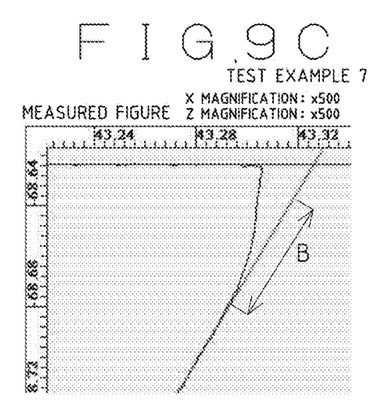
FIG. 9C shows a Test Example 7.
Figure 9D:
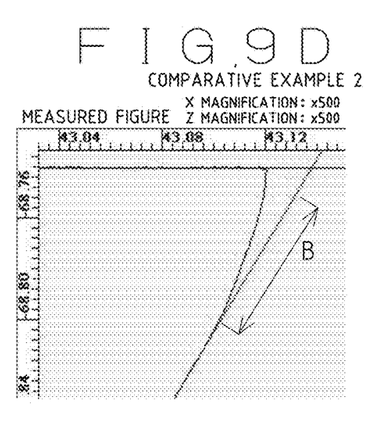
FIG. 9D shows a Comparative Example 2.

Circled number 1 in FIGS. 8A to 8C corresponds to the Test Example 5, and the cross-sectional shape of the cutting edge after the cutting test with the cemented carbide replaceable knife of the Test Example 5 is illustrated in FIG. 9A. Circled number 2 in FIGS. 8A to 8C corresponds to the Test Example 6, and the cross-sectional shape of the cutting edge after the cutting test with the cemented carbide replaceable knife of the Test Example 6 is illustrated in FIG. 9B. Circled number 3 in FIGS. 8A to 8C corresponds to the Test Example 7, and the cross-sectional shape of the cutting edge after the cutting test with the cemented carbide replaceable knife of the Test Example 7 is illustrated in FIG. 9C. FIG. 9D illustrates the cross-sectional shape of the cutting edge after the cutting test with the cemented carbide replaceable knife of the Comparative Example 2 in which the knife having the coating formed on the rake face and the clearance face under the same conditions as set for the cemented carbide replaceable knife of the Test Example 6 was subjected to grinding for edging to remove the coating on the clearance face. That is, the film thickness of the coating that coats the rake face of the cemented carbide replaceable knife of the Comparative Example 2 is the same as the film thickness of the rake-face coating portion of the Test Example 6. The rake-face coating portion of each of the cemented carbide replaceable knives of the Test Examples 5 to 7 is thicker at the coating than the clearance-face coating portion. As illustrated in FIGS. 9B and 9C, it is apparent that the cemented carbide replaceable knives of the Test Examples 6 and 7 wherein the ratio of the film thickness of the clearance-face coating portion to the film thickness of the rake-face coating portion is 0.15 or less suppress the dropping of the sharpness of the cutting edge even in comparison with the cemented carbide replaceable knife of the Comparative Example 2 illustrated in FIG. 9D. Further, as illustrated in FIGS. 9A to 9D, it can be seen that the cemented carbide replaceable knives of the Test Examples 5 to 7 wherein both of the rake face and the clearance face are coated with the coating have a wearing area width B smaller than that of the cemented carbide replaceable knife of the Comparative Example 2 wherein only the rake face is coated with the coating.

Figure 10A:
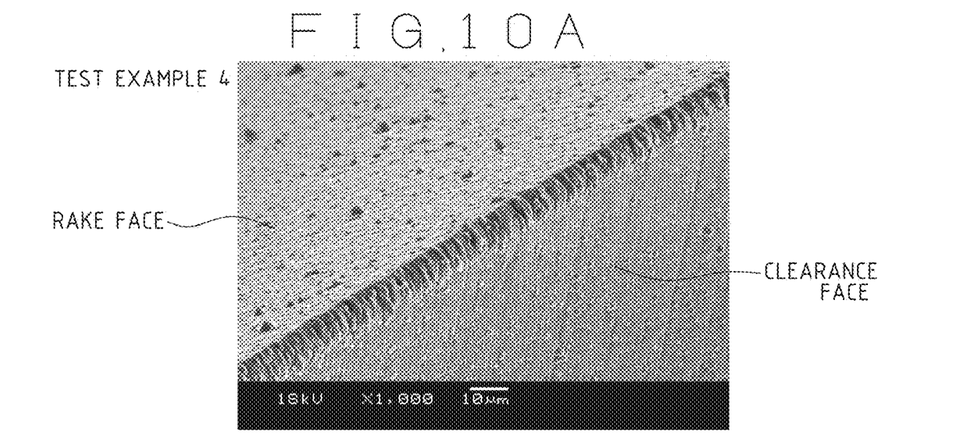
FIG. 10A shows the Test Example 4.
Figure 10B:
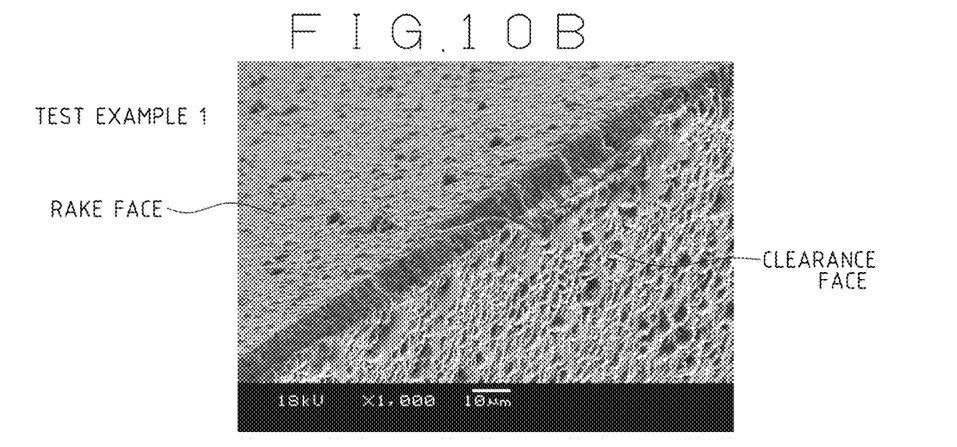
FIG. 10B shows the Test Example 1.
Figure 10C:
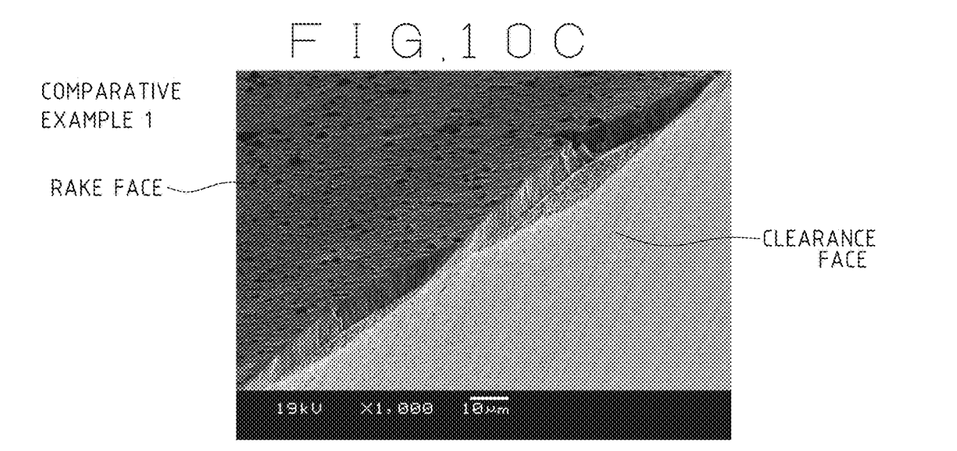
FIG. 10C shows the Comparative Example 1.

FIG. 10A is an electron microscopic photograph showing the cutting edge of the cemented carbide replaceable knife of the Test Example 4 in enlargement, FIG. 10B is an electron microscopic photograph showing the cutting edge of the cemented carbide replaceable knife of the Test Example 1 in enlargement, and FIG. 10C is an electron microscopic photograph showing the cutting edge of the cemented carbide replaceable knife of the Comparative Example 1 in enlargement, each showing a state before the cutting test is conducted. As illustrated in FIG. 10C, it can be confirmed that relatively large chipping has occurred at the cutting edge of the cemented carbide replaceable knife of the Comparative Example 1 that was subjected to grinding for edging after the formation of the coating, and it is seen that chipping of the cutting edge has not occurred at the cemented carbide replaceable knife of the Test Example 4 wherein the ratio of the film thickness of the clearance-face coating portion to the film thickness of the rake-face coating portion is 0.05 or less. It can also be confirmed that chipping of the cutting edge has not occurred at the cemented carbide replaceable knife of the Test Example 4 as compared with the cemented carbide replaceable knife of the Test Example 1. It is assumed that when the coating is formed in such a way that the ratio of the film thickness of the clearance-face coating portion to the film thickness of the rake-face coating portion becomes larger than 0.15 as in the Test Example 1 illustrated in FIG. 10B, high compression stress may locally remain on the cutting edge, causing the cutting edge to self-destruct or to be easily chipped at the time of cutting. Accordingly, the coating of the clearance face is formed thinner than that of the rake face in such a way that the ratio of the film thickness becomes 0.15 or less, as in the cemented carbide replaceable knife of the Test Example 4, residual compression stress may be suppressed, thus making it possible to prevent chipping of the cutting edge.

Figure 11A:
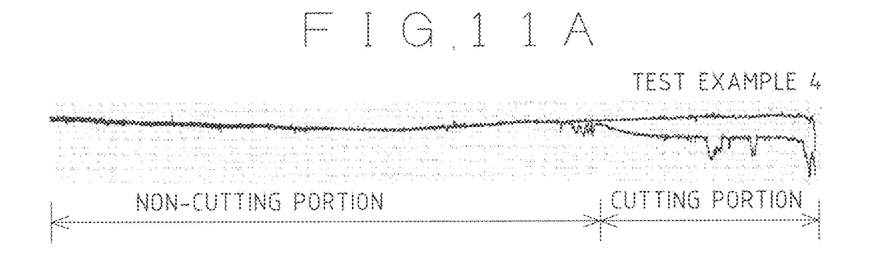
FIG. 11A shows the Test Example 4.
Figure 11B:
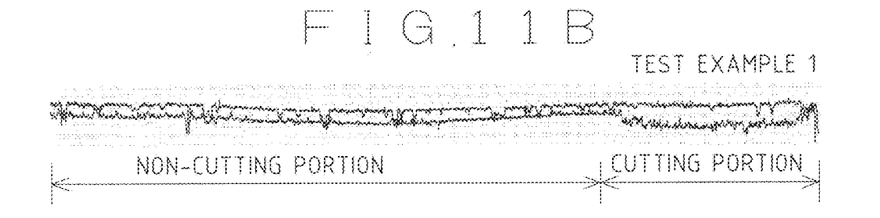
FIG. 11B shows the Test Example 1.
Figure 11C:
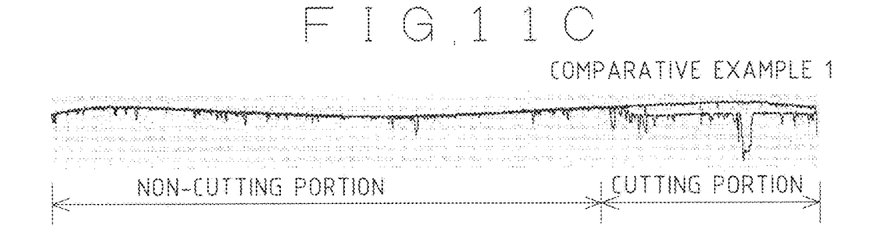
FIG. 11C shows the Comparative Example 1.
Figure 12A:
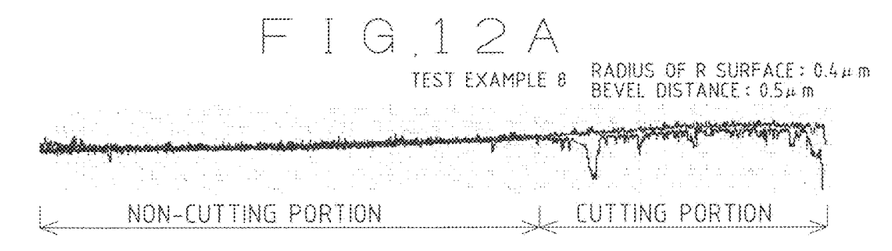
FIG. 12A shows the Test Example 8.
Figure 12B:
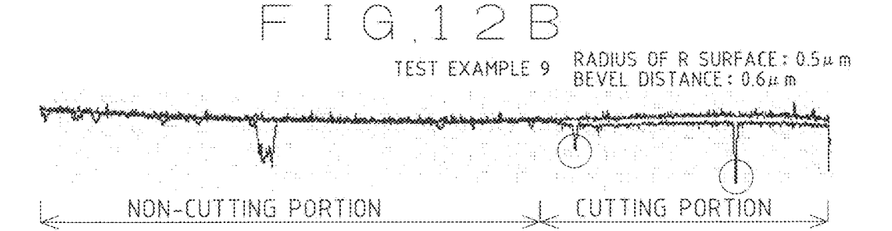
FIG. 12B shows a Test Example 9.
Figure 12C:
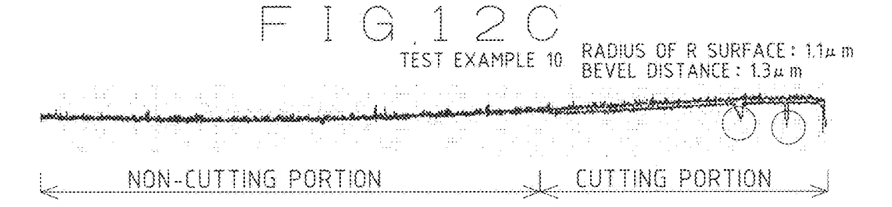
FIG. 12C shows a Test Example 10, FIG. 1.2D shows a Test Example 11.
Figure 12D:
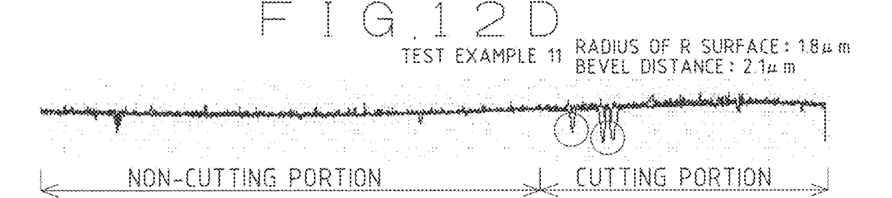
Figure 12E:
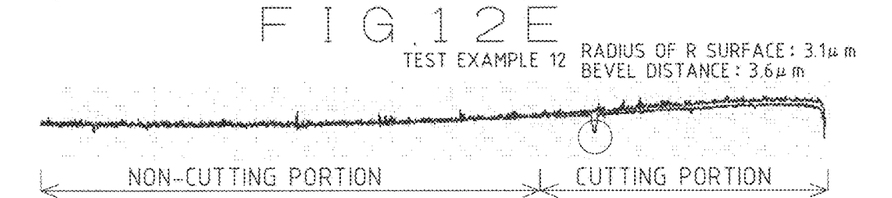
FIG. 12E shows a Test Example 12.
Figure 12F:
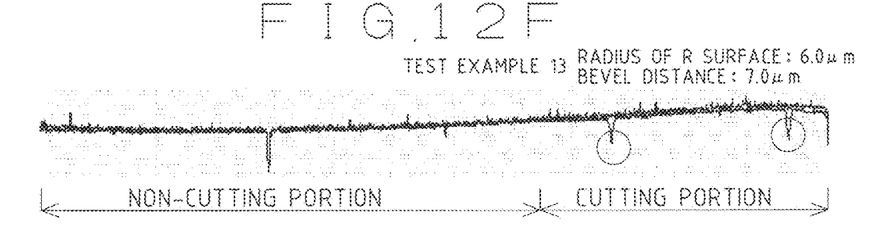
FIG. 12F shows a Test Example 13.

The cutting test described referring to the Test 1 was performed for each of the cemented carbide replaceable knives of the Test Example 4, Test Example 1, and Comparative Example 1, and changes in the edge line roughness after cutting from the edge line roughness before cutting were confirmed. The results are illustrated in FIGS. 11A to 11C. Each diagram of FIGS. 11A to 11C shows the results in terms of the aspect ratio in a case where the magnification of the horizontal axis which is the extending direction of the cutting edge line is 10 fold, whereas the magnification of the vertical axis which indicates a change from the cutting edge line before cutting is 500 fold. In the cutting in the Test 1, the cutting portion that directly contacts a workpiece material is 4.5 mm. The amount of recession of the cutting edge line at the cutting portion in the Test Example 4 in FIG. 11A after cutting is 9 to 10 μm. It is indicated that the more the cutting edge line after cutting is separated from the cutting edge line before cutting, the greater the recession or chipping occurs. As illustrated in FIGS. 11B and 11C, in the cemented carbide replaceable knives of the Test Example 1 and the Comparative Example 1, chipping occurs not only at the cutting portion that comes in direct contact with the workpiece material, but also at the non-cutting portion that does not contact the workpiece material at the time of cutting; it is apparent that when the coating is formed in such a way that the ratio of the film thickness of the clearance-face coating portion to the film thickness of the rake-face coating portion becomes larger than 0.15, chipping at the non-cutting portion is apparent. In contrast, according to the cemented carbide replaceable knife of the Test Example 4, which is an embodiment of the invention, it is seen that chipping hardly occurs at the non-cutting portion of the cemented carbide replaceable knife, and the cutting edge maintains a good cutting edge quality before and after cutting.

[Test 3]

In the PVD apparatus, composite multilayer coatings having a lamination of CrN, CrNO and $Cr_2O_3$ were formed on the base materials comprising a cemented carbide under the same conditions, thereby preparing cemented carbide replaceable knives for router bits of Test Examples 8 to 13. Each cemented carbide replaceable knife has a shape as shown in FIGS. 1A and 1B, and has a length L of 20 mm, a width W of 12 mm, and a thickness T of 1.5 mm, with a wedge angle θ being set to 55°. The cemented carbide replaceable knives of the Test Examples 8 to 13 each have a rake-face coating portion with a film thickness of 5 μm to 6 μm formed on the rake face, and the film thickness distribution of the coating on the rake face and the clearance face is the same as that of the Test Example 4 in the Test 1 (circled number 4 in FIGS. 6A to 6C). The portion of the base material of each of the Test Examples 9 to 13 that corresponds to the cutting edge was formed in an arc shape (R surface) by blasting, whereas blasting was not performed on the portion of the base material of the Test Example 8 that corresponds to the cutting edge. At this time, the radius r of the R surface of the portion of the base material that corresponds to the cutting edge (bevel distance x from the intersection of the extension line of the rake face of the base material with the extension line of the clearance face of the base material) is 0.5 (0.6) μm for the Test Example 9, 1.1 (1.3) μm for the Test Example 10, 1.8 (2.1) μm for the Test Example 11, 3.1 (3.6) μm for the Test Example 12, 6.0 (7.0) μm for the Test Example 13, 0.4 (0.5) μm for the Test Example 8 for which blasting was not performed. In addition, the bevel distance x is calculated through an equation {the radius r of the R surface/sin (wedge angle θ)}−the radius r of the R surface. The composite multilayer coating of the Test 3 has a structure including five layers of CrN, one layer of CrNO, one layer of $Cr_2O_3$, one layer of CrN, one layer of CrNO, and one layer of $Cr_2O_3$ laminated from the base material side in the named order, and the film thicknesses of the individual layers with respect to the total thickness are, from the base material in order, 50% for the CrN layer, 10% for the CrNO layer, 10% for the $Cr_2O_3$ layer, 10% for the CrN layer, 10% for the CrNO layer, and 10% for the topmost $Cr_2O_3$ layer. Note that the CrNO layer is an oxynitride, which does not show diffraction peaks of a chromium oxide in X-ray diffraction. Further, the $Cr_2O_3$ layer shows diffraction peaks of a chromium oxide appearing in X-ray diffraction, and the $Cr_2O_3$ layer may also contain nitrogen slightly.

In the Test 3, a cutting test for cutting a European red pine laminated lumber with an NC router having a router bit (cutting diameter of 46 mm) fitted with the cemented carbide replaceable knives of the Test Examples 8 to 13. The workpiece material was cut 60 m with the knife cut in the workpiece material by 20 mm at the rotational speed of the router bit of 6000 rpm, while feeding the workpiece material at the feeding speed of 1 m/min. Then, changes in the edge line roughness after cutting from the edge line roughness before cutting were confirmed. The results are illustrated in FIGS. 12A to 12F. Each diagram of FIGS. 12A to 12F shows the results in terms of the aspect ratio in a case where the magnification of the horizontal axis which is the extending direction of the cutting edge line is 10 fold, whereas the magnification of the vertical axis which indicates a change from the cutting edge line before cutting is 500 fold. In the cutting in the Test 3, the cutting portion that directly contacts a workpiece material is 5.0 mm.

As illustrated in FIGS. 12A to 12F, relatively large chipping occurs at a single location on the cutting portion in the Test Example 8, and small chipping occurs at many locations on the cutting portion, whereas chipping merely occurs at one to three locations on the circled cutting portion in the Test Examples 9 to 13 wherein the portion of the base material that corresponds to the cutting edge is formed in an arc shape. It can thus be confirmed that rounding the portion of the base material that corresponds to the cutting edge to have very small R significantly contributes to suppression of chipping at the cutting portion of the cutting edge. Even in the Test Example 8 where blasting has not been performed on the portion of the base material that corresponds to the cutting edge, it can be confirmed that chipping has hardly occurred at the non-cutting portion as in the Text Examples 9 to 13 because the ratio of the film thickness of the clearance-face coating portion to the film thickness of the rake-face coating portion lies within the range of 0.01 to 0.05.

[Modifications]

The structure is not limited to those described above, and may be modified, for example, as follows.

(1) The cutting tool is not limited to the shape illustrated in FIGS. 1A and 1B, and is formed appropriately in accordance with the workpiece material and the cutting method.

(2) Examples of the cutting tools to which the invention is applicable include a flat knife such as a planer knife, a cutter, a tipped saw blade, a router bit, a knife, a hollow chisel, and replaceable knives therefor.

(3) The cutting tool according to the invention is not limited to the use for wood, and may be favorably used to cut non-ferrous metals and alloys thereof, woody materials or resins.

DESCRIPTION OF REFERENCE NUMERALS 12 base material
12b rake face (of the base material)
12c clearance face (of the base material)
14 rake face
16 clearance face
18 cutting edge
20 coating
22 rake-face coating portion
24 clearance-face coating portion
C1, C2 film thickness

The invention claimed is:

1. A cutting tool that has a coating formed to coat a base material over at least a part of a rake face and a part of a clearance face including a cutting edge, and is for use in cutting non-ferrous metals, alloys thereof, wood, woody materials or resins, wherein:
   the coating is formed so that either one of a rake-face coating portion coating the rake face or a clearance-face coating portion coating the clearance face becomes thicker than one of the clearance-face coating portion or the rake-face coating portion, and
   a film thickness of the thicker coating portion is set in a range of 0.5 μm to 15.0 μm, and a ratio of a film thickness of the thinner coating portion to the film thickness of the thicker coating portion is set in a range of 0.01 to 0.15, and
   a portion of the base material that corresponds to the cutting edge is formed so as to be separated from an intersection of an extension line of a rake face of the base material and an extension line of a clearance face of the base material in a range of 0.2 μm to 18 μm.

2. The cutting tool according to claim 1, wherein the portion of the base material that corresponds to the cutting edge is formed in an arc shape with a radius of 0.5 μm to 6.0 μm.

3. The cutting tool according to claim 2, wherein the ratio of the film thickness of the thinner coating portion to the film thickness of the thicker coating portion is set in a range of 0.01 to 0.05.

4. The cutting tool according to claim 3, wherein the coating has a layer comprising one or more of nitride, oxynitride, oxide, carbide, carbonate, carbonitride and carboxynitride each of which contains at least chromium.

5. The cutting tool according to claim 1, wherein the ratio of the film thickness of the thinner coating portion to the film thickness of the thicker coating portion is set in a range of 0.01 to 0.05.

6. The cutting tool according to claim 5, wherein the coating has a layer comprising one or more of nitride, oxynitride, oxide, carbide, carbonate, carbonitride and carboxynitride each of which contains at least chromium.

7. The cutting tool according to claim 1, wherein the coating has a layer comprising one or more of nitride, oxynitride, oxide, carbide, carbonate, carbonitride and carboxynitride each of which contains at least chromium.

* * * * *